United States Patent
Richter et al.

(10) Patent No.: US 10,646,962 B2
(45) Date of Patent: May 12, 2020

(54) METHOD FOR PRODUCING LOW-PRESSURE TURBINE BLADES FROM TIAL

(71) Applicant: MTU Aero Engines AG, Munich (DE)

(72) Inventors: Karl-Hermann Richter, Markt Indersdorf (DE); Herbert Hanrieder, Hohenkammer (DE)

(73) Assignee: MTU AERO ENGINES AG, Munich (DE)

( * ) Notice: Subject to any disclaimer, the term of this patent is extended or adjusted under 35 U.S.C. 154(b) by 980 days.

(21) Appl. No.: 14/384,452

(22) PCT Filed: Mar. 28, 2013

(86) PCT No.: PCT/DE2013/000171
§ 371 (c)(1),
(2) Date: Sep. 11, 2014

(87) PCT Pub. No.: WO2013/152750
PCT Pub. Date: Oct. 17, 2013

(65) Prior Publication Data
US 2015/0129583 A1 May 14, 2015

(30) Foreign Application Priority Data

Apr. 13, 2012 (DE) .................. 10 2012 206 125

(51) Int. Cl.
*B23K 26/354* (2014.01)
*B22F 3/105* (2006.01)
(Continued)

(52) U.S. Cl.
CPC .......... *B23K 26/354* (2015.10); *B22F 3/1055* (2013.01); *B22F 3/24* (2013.01);
(Continued)

(58) Field of Classification Search
CPC ............ B23K 26/0006; B23K 26/0081; B23K 26/123; B23K 26/60; B22F 3/1055; B22F 5/04; F01D 5/005; B33Y 10/00
(Continued)

(56) References Cited

U.S. PATENT DOCUMENTS 6,215,093 B1 4/2001 Meiners et al.
6,364,971 B1 * 4/2002 Peterson, Jr. ............ B23K 9/00
148/525

(Continued)

FOREIGN PATENT DOCUMENTS

DE 19631584 A1 2/1998
DE 102004041633 A1 3/2006
(Continued)

*Primary Examiner* — Ibrahime A Abraham
*Assistant Examiner* — John J Norton
(74) *Attorney, Agent, or Firm* — Abel Schillinger, LLP

(57) ABSTRACT

The invention relates to a method for producing a low-pressure turbine blade from a TiAl material by means of a selective laser melting process, wherein during production in the selective laser melting process the already partially manufactured low-pressure turbine blade is preheated by inductive heating, and wherein the selective laser melting process is carried out under protective gas, the protective gas atmosphere containing contaminants of oxygen, nitrogen, and water vapor in each case of less than or equal to 10 ppm.

17 Claims, 2 Drawing Sheets

(51) Int. Cl.
- *B22F 5/04* (2006.01)
- *B23K 26/60* (2014.01)
- *B23K 26/00* (2014.01)
- *B33Y 50/02* (2015.01)
- *B22F 3/24* (2006.01)
- *B33Y 10/00* (2015.01)
- *B23K 26/12* (2014.01)
- *F01D 5/00* (2006.01)
- *B23K 103/14* (2006.01)
- *B23K 101/00* (2006.01)
- *B23K 103/10* (2006.01)

(52) U.S. Cl.
CPC ............ *B22F 5/04* (2013.01); *B23K 26/0006* (2013.01); *B23K 26/123* (2013.01); *B23K 26/60* (2015.10); *B33Y 10/00* (2014.12); *B33Y 50/02* (2014.12); *F01D 5/005* (2013.01); *B22F 2003/248* (2013.01); *B22F 2999/00* (2013.01); *B23K 2101/001* (2018.08); *B23K 2103/10* (2018.08); *B23K 2103/14* (2018.08); *F05D 2220/3215* (2013.01); *F05D 2230/31* (2013.01); *Y02P 10/295* (2015.11)

(58) Field of Classification Search
USPC ... 219/121.6, 121.65–121.66, 601, 602, 609, 219/610
See application file for complete search history.

(56) References Cited

U.S. PATENT DOCUMENTS

| | | | |
|---|---|---|---|
| 6,391,251 | B1 | 5/2002 | Keicher et al. |
| 6,676,892 | B2 | 1/2004 | Das et al. |
| 6,835,675 | B2* | 12/2004 | Yamazaki ............... G10L 17/22 |
| | | | 219/121.6 |
| 7,371,428 | B2* | 5/2008 | Russo .................... C23C 10/02 |
| | | | 427/250 |
| 8,584,357 | B2 | 11/2013 | Richter et al. |
| 2002/0015654 | A1 | 2/2002 | Das et al. |
| 2008/0014457 | A1 | 1/2008 | Gennaro |
| 2010/0151145 | A1 | 6/2010 | Richter et al. |
| 2010/0310407 | A1* | 12/2010 | Koehl .................. C22C 1/0433 |
| | | | 419/33 |
| 2012/0213659 | A1 | 8/2012 | Bayer et al. |
| 2013/0143068 | A1 | 6/2013 | Richter et al. |

FOREIGN PATENT DOCUMENTS

| | | |
|---|---|---|
| DE | 102006058949 A1 | 6/2008 |
| DE | 102009051479 A1 | 5/2011 |
| DE | 102010026084 | 1/2012 |
| DE | 102010026139 A1 | 1/2012 |
| WO | 0191924 A1 | 12/2001 |

* cited by examiner

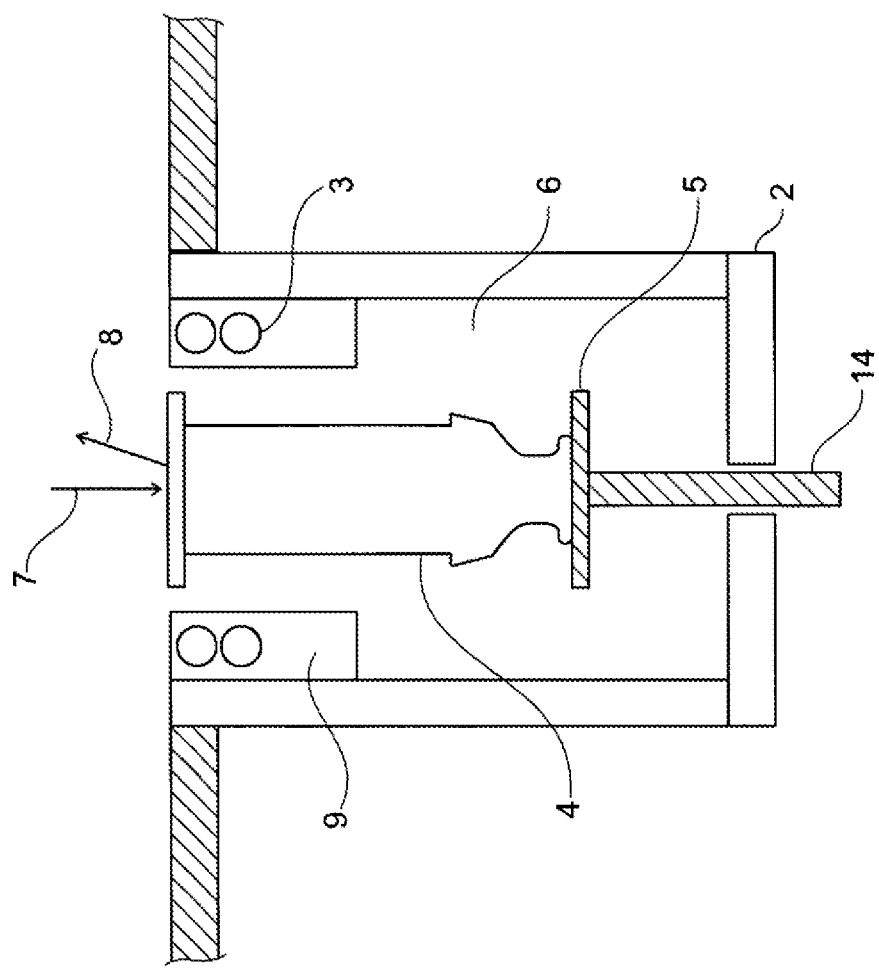

METHOD FOR PRODUCING LOW-PRESSURE TURBINE BLADES FROM TIAL

BACKGROUND OF THE INVENTION

Field of the Invention

The present invention relates to a method for producing low-pressure turbine blades from titanium aluminide materials.

Discussion of Background Information

Low-pressure turbine blades made of titanium aluminide (TiAl) materials are suitable for use in a low-pressure turbine of modern aero engines as they are lightweight. However, for use in low-pressure turbines, the TiAl blades must fulfill certain strength requirements, which limits the choice of production methods. For example, TiAl low-pressure turbine blades with high strength requirements can no longer be produced simply by casting but must be generated by isothermal forging. This is most onerous.

DISCLOSURE OF THE INVENTION

Object of the Invention

It is therefore an object of the present invention to provide an alternative production method which can be carried out more efficiently and thus more cost-effectively. At the same time, however, the properties of the TiAl low-pressure turbine blades should not be negatively influenced by the production method.

Technical Solution

This object is achieved by means of a method having the features of claim 1. Advantageous configurations form the subject matter of the dependent claims.

The present invention proposes producing high-strength TiAl blades for low-pressure turbines by means of a generative method, specifically by means of what is termed an SLM (Selective Laser Melting) process. This is for example described, in general terms for turbomachine components such as guide vanes or rotor blades, in DE 10 2010 026 139 A1, whose entire content of disclosure is hereby incorporated by reference.

On account of the particular properties of titanium aluminides and/or TiAl materials, however, this method is subject to additional developments in order to achieve the desired result.

First, in order to prevent cracks, the partially produced component is preheated by means of inductive heating, such that the temperature is above the ductile-brittle transition temperature of the TiAl materials. This is for example also described in DE 10 2006 058 949 A1 for the repair of blade tips. The entire content of disclosure of this document is also hereby incorporated by reference.

Furthermore, the selective laser melting is carried out in a high-purity shielding gas atmosphere. The purpose of the high-purity shielding gas atmosphere is in particular to keep the levels of oxygen, nitrogen and water vapor low. The concentration of each of these impurities should preferably be less than 10 ppm, in particular less than or equal to 5 ppm.

The shielding gas atmosphere can be generated by means of a shielding gas which is purified immediately before introduction into a process space in which the selective laser melting is carried out. Alternatively, appropriately pre-purified shielding gas may also be used.

Helium may be used as the shielding gas. The working pressure of the shielding gas during the selective laser melting may be in the range from 50 to 1100 mbar, in particular 100 to 1000 mbar.

Various TiAl materials are suitable. In the present disclosure, a TiAl material is understood to be any material having, in its lattice structure, a component of an intermetallic phase such as $\gamma$-TiAl or $\alpha_2$-Ti$_3$Al. Alloys having corresponding TiAl phases also come under the term TiAl material, such as alloys with niobium, boron, manganese, that is to say what are termed TNB or TNM alloys.

For the selective laser melting, the TiAl material is used in powder form. The powder may have a grain size distribution, e.g. a normal distribution. The grain size of the TiAl material powder can be chosen such that the grain size distribution has a maximum in the region between 20 µm and 50 µm.

In order to achieve high strength in the TiAl materials, a high-purity TiAl starting powder can be used. Such a powder can for example be produced by means of the EIGA (Electrode Induction Melting Gas Atomization) method.

In the selective laser melting, a plurality of low-pressure turbine blades may be produced simultaneously in the same process space, wherein however the temperature may be adjusted individually for each turbine blade by means of the inductive preheating in order to ensure that the temperature does not drop below the ductile-brittle transition temperature of the TiAl material.

It is possible, by means of the selective laser melting, for the TiAl low-pressure turbine blade to be produced in near-net shape, such that almost no further post-treatment is necessary. Only compression by hot isostatic pressing and/or surface treatment by polishing may still be required.

BRIEF DESCRIPTION OF THE DRAWINGS

The appended drawings show, purely schematically, in

EXEMPLARY EMBODIMENT

Figure 1:
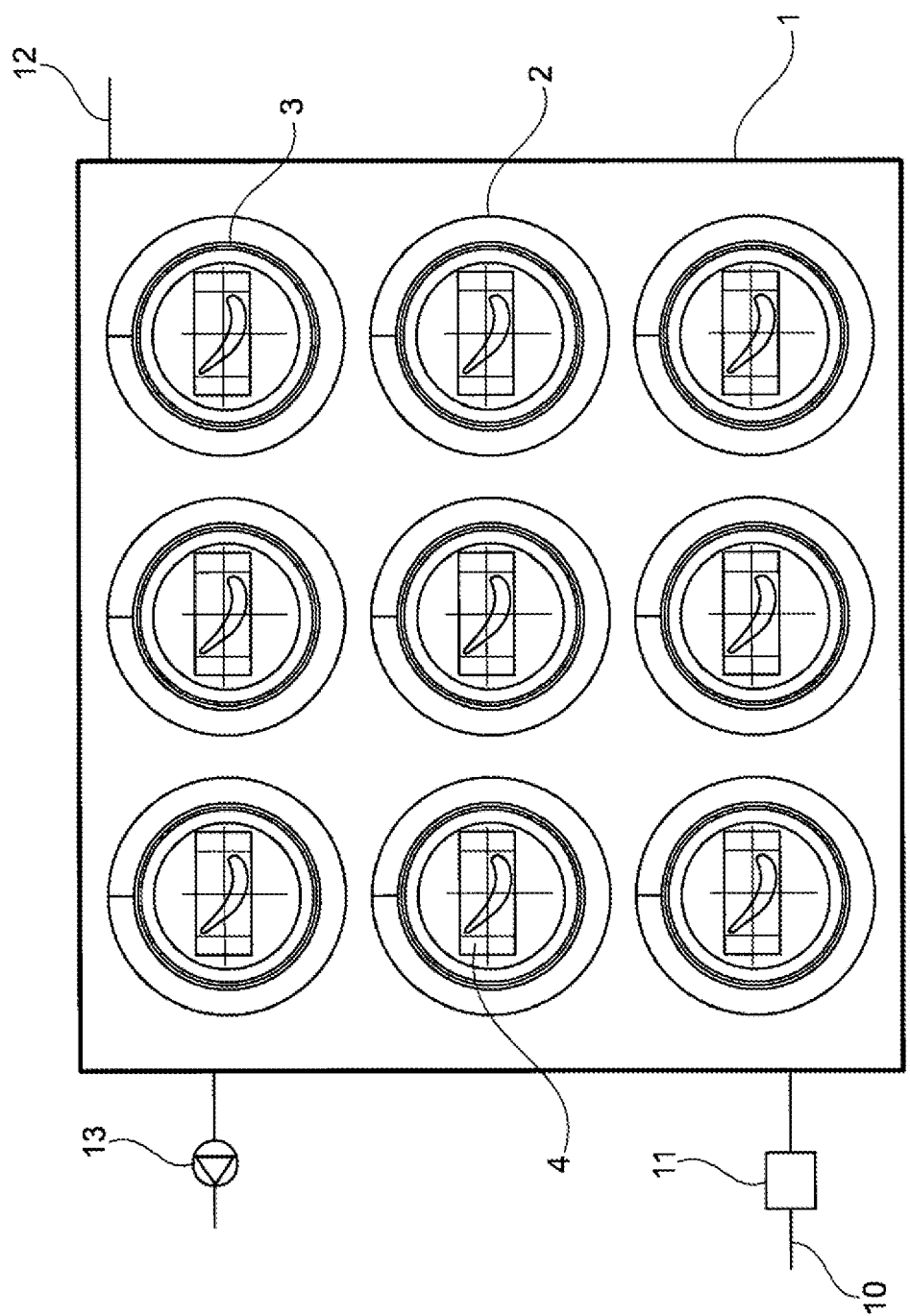
FIG. 1 a plan view of a processing space for producing a low-pressure turbine blade from a TiAl material in accordance with the present invention; and in FIG. 2 a cross-sectional view through a working chamber of the processing space from FIG. 1 for carrying out the method for producing a low-pressure turbine blade from a TiAl material in accordance with the present invention.

Further advantages, characteristics and features of the present invention will become clear from the following detailed description of an exemplary embodiment, with reference to the appended Figures. However, the invention is not limited to this exemplary embodiment.

FIG. 1 shows a processing space 1 with nine working chambers 2 in which low-pressure turbine blades 4 may be simultaneously produced from a TiAl material. The working space is formed in a gas-tight manner in order to ensure that the method is carried out under defined environmental conditions within the working space. Accordingly, evacuation means 13, such as vacuum pumps or the like, may be provided in order to be able to pump out and empty the working space. Also provided is a gas supply 10 by means of which desired process gas can be introduced into the working space 1. In the exemplary embodiment 11 shown, the gas supply 10 has a gas purification unit 11 which can additionally purify the supplied gas. Furthermore, it is of course possible to introduce gas which is already of the appropriate purity directly into the working space 1.

The gas purification unit 11 has, in particular, means for removing oxygen, nitrogen and water vapor, such that process gas having low oxygen, nitrogen and water vapor contents can be introduced into the working space 1. It is advantageous for the method according to the invention for the concentrations of oxygen, nitrogen and water vapor to each be less than 5 ppm.

In order to speed up the stocking and/or the emptying of the working space 1, and in order to shorten the processes of evacuating and cleaning the working space 1, a lock device can be provided for loading and unloading the process chamber.

A gas outlet 12 is additionally provided in order to remove the process gas from the working space 1.

FIG. 2 shows a cross section through a working chamber 2 in which a single low-pressure turbine blade 4 is produced. The working chamber 2 is substantially formed as a container in which a platform 5 is arranged such that it can be moved by means of a ram 14. In the working chamber 2, powder is provided on top of the platform 5, which is at first arranged in the upper region of the working chamber 2, such that, there, a laser beam 7 can melt the powder which is on the platform 5, in order that a corresponding component results once the melted powder has solidified. By lowering the platform 5 step by step, and covering it with powder 6 each time, and by melting the powder layer by layer according to the contour to be produced, the low-pressure turbine blade 4 is produced step by step.

In order to avoid cracks during production, the partially produced low-pressure turbine blade 4 is inductively preheated in the region where the powder is applied, such that the temperature of the already partially produced blade is above the ductile-brittle transition. To that end, an induction coil 3, which is encased in an insulating mass 9, for example in ceramic, is used.

A pyrometer or a heat-sensitive camera, which detects the heat radiation 8 and accordingly determines the temperature, is used to monitor the preheat temperature.

In order to precisely control the temperature of each individual low-pressure turbine blade, a pyrometer or heat-sensitive camera, which calculates the temperature, is provided for each working chamber 2, it being possible to control and/or regulate the induction coil 3 using the detected temperature as a control or regulating variable. To that end, a corresponding control and/or regulating unit, preferably based on a data processing unit with corresponding software, can be provided.

The powder 6 used for producing the low-pressure turbine blade made of TiAl is a high-purity TiAl powder having a grain size distribution with a maximum between 20 µm and 50 µm. The grain size distribution commonly follows a normal distribution. The high-purity TiAl powder has a low concentration of impurities which is achieved in particular in that it is produced by means of what is termed the EIGA (Electrode Induction Melting Gas Automation) process, in which the starting material is converted to powder form in contactless fashion by inductive melting, such that impurities are introduced into the powder neither by melting nor by solidification.

The processing space is operated using a helium atmosphere which is set with a gas pressure in the range from 100 to 1000 millibar. By using the gas purification unit 11 or an appropriately purified gas having a low concentration of impurities, also during the generative production process of the present invention, no impurities are introduced into the low-pressure turbine blade material.

After production by selective laser melting in the processing space 1 or the working chamber 2, the produced low-pressure turbine blades can be compressed by hot isostatic pressing in order to eliminate any pores, in particular helium pores, in the generated components. Apart from that, it is possible by means of the selective laser melting to produce a near-net component which, apart from polishing, requires no further post-treatment. Polishing can for example be carried out using the MMP (Micro Machining Process) technology developed by BestinClass.

For the operation of the induction coils 3, individual high-frequency generators may be provided for each of the nine processing chambers 2 of the processing space 1, or a plurality of working chambers, for example along a row or a cleft, may be operated by means of one high-frequency generator. It is furthermore also conceivable for all nine induction coils 3 of the working chambers 2 to be operated by a single high-frequency generator.

Although the present invention has been described in detail with reference to the exemplary embodiment, it will be obvious to a person skilled in the art that the invention is not restricted to this exemplary embodiment, rather that changes or extensions are possible in a manner which omits individual features or creates various combinations of features, without departing from the scope of protection of the appended claims. In particular, the present invention encompasses all combinations of all presented individual features.

What is claimed is:

1. A method for producing a low-pressure turbine blade from a TiAl material by selective laser melting, wherein the method comprises preheating, during production by selective laser melting, an already partially produced low-pressure turbine blade by inductive heating, and carrying out the selective laser melting under an atmosphere of shielding gas contaminated with not more than 10 ppm of each of oxygen, nitrogen and water vapor.

2. The method of claim 1, wherein the shielding gas is contaminated with not more than 5 ppm of each of oxygen, nitrogen and water vapor.

3. The method of claim 1, wherein helium is used as the shielding gas.

4. The method of claim 1, wherein the shielding gas is provided with a pressure of from 50 to 1100 mbar in a process space for the selective laser melting.

5. The method of claim 4, wherein the shielding gas is provided with a pressure of from 100 to 1000 mbar.

6. The method of claim 1, wherein the TiAl material for the selective laser melting is used in the form of a powder with a grain size distribution having a maximum between 20 µm and 50 µm.

7. The method of claim 1, wherein a TiAl powder produced by an EIGA (Electrode Induction Melting Gas Atomization) method is used as the TiAl material for the selective laser melting.

8. The method of claim 1, wherein a plurality of low-pressure turbine blades are produced simultaneously in a process space by selective laser melting.

9. The method of claim 8, wherein the temperature of each low-pressure turbine blade is monitored during the production by selective laser melting.

10. The method of claim 9, wherein a result of temperature monitoring is supplied to a control and/or regulating unit for controlling and/or regulating an induction coil for the inductive heating.

11. The method of claim 1, wherein after the selective laser melting, the low-pressure turbine blade is subjected to hot isostatic pressing and/or a heat treatment.

12. A method for producing a low-pressure turbine blade from a TiAl material by selective laser melting, wherein the method comprises preheating, during production by selective laser melting, an already partially produced low-pressure turbine blade by inductive heating, and carrying out the selective laser melting under an atmosphere of helium contaminated with not more than 5 ppm of each of oxygen, nitrogen and water vapor.

13. The method of claim 12, wherein the helium is provided with a pressure of from 100 to 1000 mbar.

14. The method of claim 13, wherein a plurality of low-pressure turbine blades are produced simultaneously in a process space by selective laser melting.

15. The method of claim 14, wherein the temperature of each low-pressure turbine blade is monitored during the production by selective laser melting.

16. The method of claim 15, wherein a result of temperature monitoring is supplied to a control and/or regulating unit for controlling and/or regulating an induction coil for the inductive heating.

17. The method of claim 14, wherein after the selective laser melting, each low-pressure turbine blade is subjected to hot isostatic pressing and/or a heat treatment.

* * * * *